United States Patent [19]

Mallet

[11] Patent Number: 4,608,741
[45] Date of Patent: Sep. 2, 1986

[54] METHOD OF ASSEMBLING A CLUTCH RELEASE BEARING AND CORRESPONDING CLUTCH RELEASE BEARING, IN PARTICULAR FOR AUTOMOTIVE VEHICLES

[75] Inventor: Bernard Mallet, Wittelsheim, France

[73] Assignee: VALEO, Paris, France

[21] Appl. No.: 599,984

[22] Filed: Apr. 13, 1984

[30] Foreign Application Priority Data

Apr. 15, 1983 [FR] France .................................. 83 06198

[51] Int. Cl.⁴ ........................ B23P 11/02; F16C 23/08
[52] U.S. Cl. ........................................ 29/450; 29/453;
192/98; 192/110 B; 267/161; 384/611; 384/617
[58] Field of Search ............. 192/98, 110 B; 267/161, 267/162; 403/326; 29/453, 450; 384/535, 611, 617

[56] References Cited

U.S. PATENT DOCUMENTS

| 3,496,318 | 2/1970 | Culver | 267/161 X |
| 4,364,615 | 12/1982 | Euler | 267/163 X |
| 4,371,068 | 2/1983 | Billet | 192/98 |

FOREIGN PATENT DOCUMENTS 0047584  3/1982  European Pat. Off. ............. 192/98

Primary Examiner—Martin P. Schwadron
Assistant Examiner—Stephen M. Hepperle
Attorney, Agent, or Firm—Charles E. Brown; Charles A. Brown

[57] ABSTRACT

In a clutch release bearing an axially acting annular spring bears on a maneuvering member and on a radial rim on a drive member, so as to urge the latter towards a flange on the maneuvering member. The annular spring is adapted to turn inside out during assembly of the clutch release bearing and due only to the drive member acting on it, changing from a first configuration in which it is generally concave to a second configuration in which it is generally convex.

4 Claims, 11 Drawing Figures

METHOD OF ASSEMBLING A CLUTCH RELEASE BEARING AND CORRESPONDING CLUTCH RELEASE BEARING, IN PARTICULAR FOR AUTOMOTIVE VEHICLES

BACKGROUND OF THE INVENTION

1. Field of the Invention

The present invention is generally concerned with clutch release bearings, that is to say the parts which are intended, especially in automotive vehicles, to operate on the clutch release device of a clutch so as to disengage the latter.

2. Description of the Prior Art

As is known, a clutch release bearing of this kind generally comprises a first member, commonly known as the maneuvering member, which is adapted to be acted on by a control member, in practice a clutch release yoke, and a second member, commonly known as the drive member, which is adapted, when acted on by the maneuvering member, to operate on the clutch release device of the clutch to be controlled, and coupling means adapted to provide an appropriate axial linkage between said drive member and said maneuvering member.

The present invention is more particularly directed to the case where, in order to implement these coupling means, the maneuvering member comprises a transverse flange, which may be no more than a simple collar, and the drive member comprises a radial rim, there being provided for the purposes of securing the required axial retention of said drive member relative to said maneuvering member an axially acting annular spring which bears on the maneuvering member and on said radial rim of the drive member so as to urge the latter in the direction towards the flange of said maneuvering member.

This is the case, for example, in certain so-called self-centering clutch release bearings at least, in other words in certain at least of those clutch release bearings in which the drive member is free to move transversely in any direction relative to the maneuvering member, said drive member having an omnidirectional freedom of movement in contact with the flange of the latter or with a bearing part which bears axailly on said flange.

To be even more precise, this is the case with self-centering clutch release bearings of the maintained self-centering action type, in which, subject to the appropriately calibrated force applied by the axially acting annular spring employed, the drive member retains between two operations to disengage the clutch the same position relative to the maneuvering member as it occupied after the first of said clutch disengagement operations.

A maintained self-centering clutch release bearing of this type is described, for example, in French Pat. No. 2 465 119 filed on Sept. 10, 1979 under application No. 79 22532 in which, in the usual manner, the maneuvering member features an annular axial member on which the axially acting annular spring employed is adapted to bear.

In practice, this is a sleeve to the outside of which in the radial direction is rigidly attached the associated flange and on which the inside perimeter of the axially acting annular spring bears, its outside perimeter bearing axially on the corresponding radial rim of the drive member.

Conjointly, and in the usual manner, the drive member is a ball bearing of which each ring constitutes a generally annular member.

On assembling a clutch release bearing of this kind, which is effected by axial engagement of the drive member on the maneuvering member, the axially acting annular spring employed is inserted in advance into the interior of said drive member so that, as the latter advances, its internal periphery grips the sleeve of the maneuvering member, sliding along the latter as it advances.

For this axially acting annular spring to apply, when in service, a predetermined axial load to the drive member, there has to be a predetermined axial distance between its inside perimeter, through which it bears on the sleeve of the maneuvering member, and its outside perimeter, through which it bears on the radial rim of the drive member.

However, by virtue of its sliding during engagement of the drive member on the maneuvering member, there is inevitably on completion of such engagement an axial offset between the real position of its inside perimeter along the sleeve of the maneuvering member and the position which it should occupy in order for the required elastic force to be obtained.

In French patent application No. 2 465 119, in which the flange of the maneuvering member is integral with the sleeve of the latter, said flange and said sleeve forming a single part, it is proposed, to this end, to operate from the front, that is to say from the same side as the drive member, using an annular tool which, inserted between said drive member and the sleeve of the maneuvering member, is adapted to operate on the axially acting annular spring so as to force its inside perimeter along said sleeve of the maneuvering member to the final position required for the latter, materialized in practice by an abutment shoulder provided for this purpose on said sleeve, at a distance from the associated flange.

An arrangement of this kind is satisfactory.

It has disadvantages, however: it requires the use of an additional and special tool, and the use of this tool between the drive member and the sleeve of the maneuvering member necessitates the provision for this purpose of sufficient annular space between said drive member and said sleeve, which is prejudicial to the overall radial dimension of the assembly.

To overcome disadvantages like these, consideration might be given to separating the flange of the maneuvering member from the sleeve with which it is associated, so as to permit, on fitting the drive member, the outside perimeter of the axially acting annular spring employed to pass beyond the position which should be its final position until its inside perimeter is in the correct position and then to permit, by virtue of a retrograde movement of said flange relative to said sleeve, the outside perimeter of said spring to be placed in the required final position therefor, so obtaining the required elastic force.

This arrangement has it own disadvantages, however: after fitting the drive member to the maneuvering member it is necessary to provide specific means for ensuring appropriate axial positioning of the flange of said maneuvering member relative to the sleeve of the latter, and this arrangement involves working in two opposite axial directions, initially from the front for axial engagement of the drive member on the maneuvering member than from the rear for final positioning of said flange.

A general objective of the present invention is to provide an arrangement by means of which the disadvantages outlined above may be avoided.

SUMMARY OF THE INVENTION

In one aspect, the present invention consists in a method of assembling a clutch release bearing which incorporates a maneuvering member comprising a transverse flange and an abutment shoulder spaced from said flange, and a drive member comprising at least one generally annular axial member, a transverse radial rim adapted to bear on said flange of said maneuvering member and, between said radial rim and said annular member, an axially acting annular spring which is adapted to urge said radial rim of said drive member towards said flange of said maneuvering member, bearing to this end on said maneuvering member, and which has two stable configurations in one of which is generally concave (relative to a given axial observation direction) and in the other of which it is generally convex (relative to the same axial observation direction), in which method said drive member is fitted onto said maneuvering member in the axial direction, from the same side as said abutment shoulder and with said annular spring in a first of its configurations and, after it has come into abuting relationship with said abutment shoulder of said maneuvering member, axial movement of said drive member continues until, through the intermediary of said annular member, it causes said annular spring to turn inside out, changing from said first configuration to the second configuration.

In another aspect, the present invention consists in a clutch release bearing assembled by means of this method.

Thus, in accordance with the invention, the assembly of a clutch release bearing is advantageously effected from one side only, in the direction from the front towards the rear, by simple axial engagement of its drive member on its maneuvering member, without any tool being used.

Due to the force applied to it by an annular member forming part of the drive member, the axially acting annular spring employed changes of its own accord, in accordance with the invention, from a first of its configurations (engagement configuration) to the second of these (service configuration) in which, its dimensions being appropriately selected to this end, it is still able to apply an axial force to the radial rim of said drive member.

When, as is usual, the drive member consists of a ball bearing, the annular member of this drive member which is exploited in this way in order to turn the axially acting annular spring employed inside out may simply consist of one of the rings of the latter.

Be this as it may, a clutch release bearing in accordance with the invention is in this regard characterized in particular by the fact that its drive member comprises an annular member which, through its axial end nearest the flange of the maneuvering member, interferes with the rest configuration of the annular spring which is not that which it tends to assume within a clutch release bearing of this kind.

The ball bearing constituting the drive member preferably comprising internally, between its two rings, a deflector, this is advantageously employed to center the annular spring on said drive member before the latter is fitted to the maneuvering member.

In this regard, the clutch release bearing in accordance with the invention is further characterized in that, this drive member being a ball bearing comprising internally, between its two rings, a deflector which has a median part forming an axial bearing surface adapted to center the annular spring in the rest configuration of the latter which is not that which it tends to assume within said clutch release bearing.

This bearing surface may be generally cylindrical and parallel to the axis of the assembly, or generally part-spherical and substantially centered on the line about which the annular spring flexes.

Be this as it may, in the case of a maintained self-centering clutch release bearing, it stops short in practice at an axial distance from the radial rim of the drive member so as to no longer interfere with the annular spring in the configuration which it adopts within the clutch release bearing, and so as to thus provide the required radial clearance between the drive member and the maneuvering member.

Other objects and advantages will appear from the following description of an example of the invention, when considered in connection with the accompanying drawings, and the novel features will be particularly pointed out in the appended claims.

DESCRIPTION OF THE PREFERRED EMBODIMENTS

As shown in these figures, and in a manner known per se, the clutch release bearing in accordance with the invention generally comprises a first member 10, commonly referred to as the maneuvering member, which is adapted to be acted on by a control member, in practice a clutch release yoke (not shown), and also a second member 11, commonly referred to as the drive member, which is adapted, when acted on by the maneuvering member 10, to operate on the clutch release device of a clutch (also not shown).

The maneuvering member 10 comprises at least one generally annular axial member.

Figure 1:
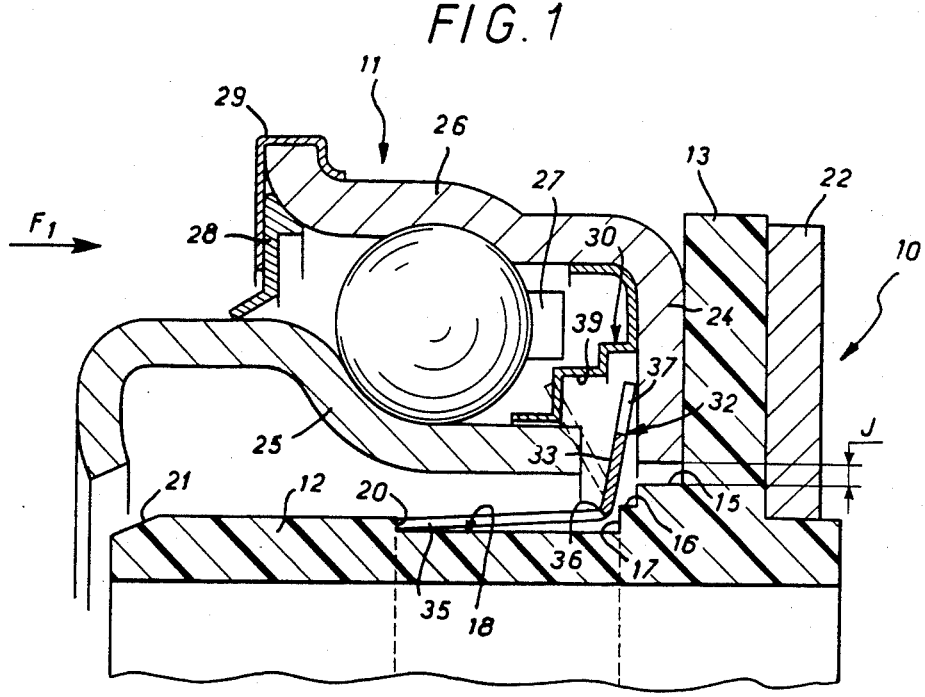
FIG. 1 is a partial view in axial cross-section of a clutch release device in accordance with the invention.
Figure 2:
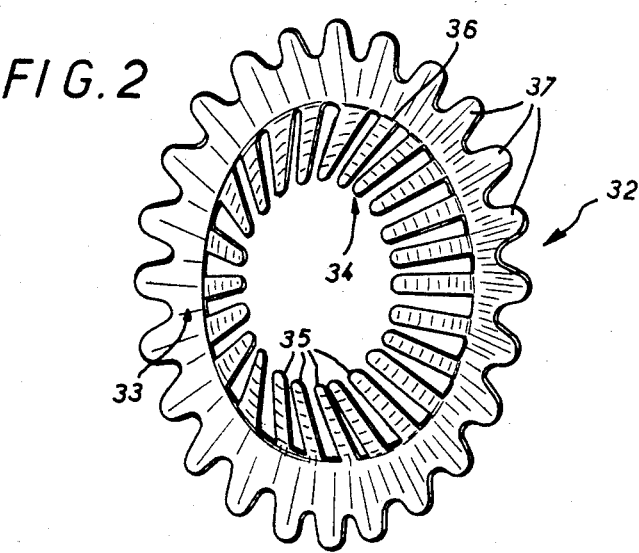
FIG. 2 is a view in perspective of the axially acting annular spring which this clutch release bearing comprises, shown in isolation.

In the embodiment shown in FIGS. 1 to 3, this is a central sleeve 12 by means of which the maneuvering member 10 and thus the entire clutch release bearing is adapted to be slidably mounted on a support and guide member (not shown).

The maneuvering member 10 further comprises a transverse flange 13 on which the drive member 11 bears in the axial direction.

In the embodiment shown in FIGS. 1 to 3, the sleeve 12 and the flange 13 are integral, being formed by portions of a single part which may be manufactured, for example, by molding any suitable synthetic material.

The drive member 11 is entirely disposed on one side of the flange 13 of the maneuvering member 10.

On the same side as the drive member 11, the maneuvering member 10 comprises, in the embodiment shown in FIGS. 1 to 3 and starting from its flange 13, in the axial direction: a first annular bearing surface 15 which projects radially relative to the sleeve 12 and the function of which will emerge hereinafter, and a second annual bearing surface 16 of smaller radius than the first delimited by a transverse shoulder 17 spaced from the flange 13, referred to hereinafter for convenience as the abutment shoulder.

In an alternative arrangement, the annular bearing surface 16 may be continuous with the annular bearing surface 15, having the same radius as the latter.

Be this as it may, like the annular bearing surface 15, the annular bearing surface 16 projects radially relative to the sleeve 13, and the same therefore applies to the abutment shoulder 17 which delimits it.

In the embodiment shown in FIGS. 1 to 3, there is also provided on the surface of the sleeve 12 a groove 18 extending from the abutment shoulder 17 in the direction away from the flange 13.

In accordance with one feature of the invention, the two transverse flanks of this groove 18 are of different heights, that nearer the flange 13, formed by the abutment shoulder 17, being also the higher.

As indicated hereinabove, the abutment shoulder 17 projects radially relative to the sleeve 12.

On the other hand, the other flank 20 of the groove 18, which is that farthest from the flange 13 in the axial direction, has the same outside radius as the sleeve 12.

Finally, on the side of the drive member 11, the outside perimeter of the axial end portion of the sleeve 12 is tapered by means of a chamfer 21.

The associated control member acts on the maneuvering member 10 from the side of the flange 13 opposite the drive member 11.

In a manner known per se, the flange 13 is to this end at least partially covered on the side opposite the drive member 11 by a plate 22, commonly referred to as a bearing plate, and made of metal, for example, to prevent the flange 13 being worn by the control member.

Generally speaking, the drive member 11 comprises at least one generally annular axial member (see below) and a transverse radial rim 24 adapted to bear on the flange 13 of the maneuvering member 10.

In the embodiments shown, and in a manner known per se, the drive member 11 consists of a ball bearing and therefore comprises two generally annular members, one consisting of its inside ring 25 and the other consisting of its outside ring 26.

In the embodiment shown in FIGS. 1 to 3, it is by means of its appropriately shaped inside ring 25 that the drive member 11 is adapted to act on the clutch release device of the clutch to be controlled, and the radial rim 24 through which it bears axially on the flange 13 of the maneuvering member 10 forms part of its outside ring 26.

This radial rim 24 is therefore directed radially towards the axis of the assembly, in line with annular bearing surface 15 on the maneuvering member 10.

As the clutch release bearing is of the self-centering type, an annular radial clearance J is provided between said annular bearing surface 15 of the maneuvering member 10 and the corresponding edge of the radial rim 24 of the drive member 11.

In the embodiment shown in FIGS. 1 to 3, the inside ring 25 and the outside ring 26 of the ball bearing constituting the drive member 11 are both stamped from sheet metal and, in a manner known per se, said ball bearing comprises a ball cage 27 between these rings to retain the balls and, to contain the lubricating grease usually employed, a seal 28 at the front, held in position by a cap 29 crimped to the outside ring 26 and, at the rear, a deflector 30.

In the embodiments shown, this deflector 30 is formed by a part separate from the ball cage 27, but as an alternative it may be an integral part thereof.

Be this as it may, a slight annular clearance is usually provided between this deflector 30 and the inside ring 25 which in the embodiments shown in FIGS. 1 to 6 and 8 is that designed to rotate in service.

As this is a self-centering clutch release bearing in which the self-centering action is maintained, there is provided in a manner known per se, for the purpose of retaining the drive member 11 axially in position relative to the manuevering member 10, an axially acting annular spring 32 which bears on the maneuvering member 10, this arrangement to be described in more detail hereinafter, and on the radial rim 24 of the drive member 11 so as to thus urge this radial rim 24 and therefore the drive member 11 as a whole towards and into contact with the flange 13 of the maneuvering member 10.

In accordance with the invention, the annular spring 32 is of the kind adapted to flex between two stable configurations, in one of which it is generally concave, relative to a given axial observation direction, and in the other of which it is generally convex, relative to the same axial observation direction.

For convenience, this observation direction is taken in this instance as the axial direction from the drive member 11 towards the flange 13 of the maneuvering member 10, as schematically represented by the arrow $F_1$ in FIG. 1.

In the embodiment shown in FIGS. 1 to 3, and as is most clearly seen in FIG. 2, the annular spring 32 employed in accordance with the invention comprises a circumferentially continuous part 33 and a central part 34 which is subdivided into fingers 35.

It will be understood that it is to the circumferentially continuous part 33 that the concavity or convexity of the annular spring 32 applies.

In other words, in defining this concavity or this convexity, the central part 34 of the annular spring 32 subdivided into fingers 35 is ignored.

Thus, considering a transverse plane perpendicular to the axis of the assembly, the circumferentially continous part 33 of the annular spring 32 lies on a first side of this plane in the concave configuration of the annular spring 32 and on the other side of this plane in the convex configuration thereof, flexing to each side of this plane.

In practice, the centreal part 34 divided into fingers 35 is at an angle to the circumferentially continous part 33 when seen in axial cross-section and, to a first approximation, it is relative to a flexing line substantially coincident with the corresponding bend 36 that the latter has a flexing capacity, the transverse plan mentioned hereinabove being then assumed to pass through this flexing line, although it should be understood that the exact position of this flexing line is indeterminate and may vary.

In the embodiment shown, the circumferentially continous part 33 has an undulating outside perimeter and thus forms tang 37 adapted to bear on the radial rim 24 of the drive member 11.

In practice, the slots which delimit the fingers 35 of the central part 34 extend to points substantially coincident with the bend 36 between the latter and the circumferentially continuous central part 33.

Figure 3A:
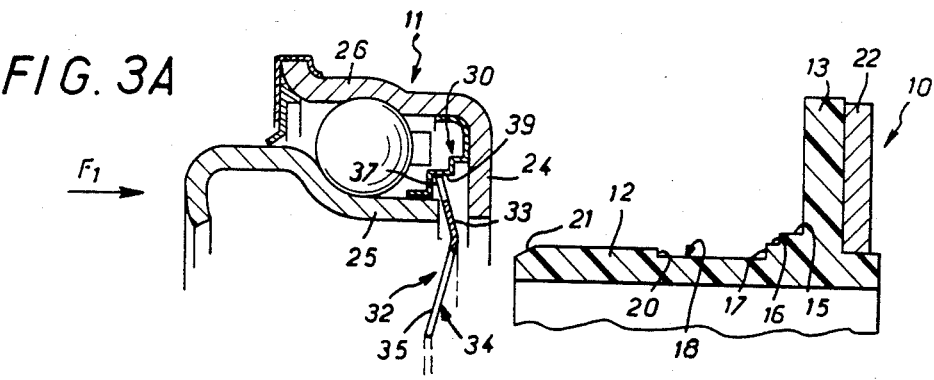
FIGS. 3A, 3B, 3C and 3D are partial axial views analogous to that of FIG. 1 to a smaller scale and showing various stages in the assembly of the clutch release device in accordance with the invention.
Figure 3B:
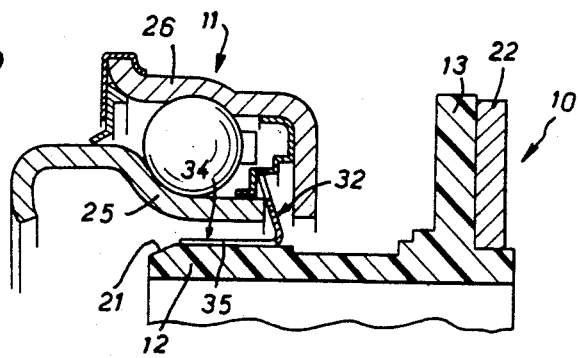

When unstressed, the thus constituted annular spring 32 has a stable configuration which, relative to the axial observation direction marked by the arrow $F_1$ in FIG. 3A and in FIG. 1, is a concave configuration, ignoring its central part 34 divided into fingers 35, as previously indicated.

For example, the angle then formed between its circumferentially continuous part 33 and its central part 34 is approximately 120°, as shown.

It is in this concave rest configuration that, on assembling the clutch release bearing in accordance with the invention, the annular spring 32 is positioned within the drive member 11 in advance, that is to say before axial engagment of the latter on the maneuvering member 10, having its circumferentially continuous part 33 disposed between the radial rim 24 of the outside ring 26 of the ball bearing constituting the drive member 11 and the corresponding edge of the inside ring 25 of the latter.

To ensure centering of this annular spring 32 relative to the drive member 11, and so to avoid the use of the wrong sleeve, the deflector 30 which the drive member 11 features is, in accordance with the invention, put to another purpose.

To this end, the deflector 30 forms, between its ends, an axial bearing surface 39 adapted to center the annular spring 32 when the latter has the rest configuration which applies at this time and which, as will emerge hereinafter, is not that which it tends to adopt within the clutch release bearing once the latter has been aseembled.

In the embodiment shown in FIGS. 1 to 3, the bearing surface 29 of the deflector 30 is generally cylindrical and parallel to the axis of the assembly.

Also, as this is a self-centering clutch release bearing, it stops short at an axial distance from the radial rim 24 of the drive member 11 so that the latter is able to move freely in the transverse direction relative to the maneuvering member 10, without interfering with the annular spring 32.

However, initially, on axial engagement of the drive member 11 on the maneuvering member 10, the annular spring 32 is substantially in contact with the bearing surface 39 of the deflector 30 of said drive member 11, through the tangs 37 constituting the outside perimeter of its circumferentially continuous part 33 (FIG. 3A).

When it is axially engaged on the maneuvering member 10, the drive member 11 entrains the annular spring 32 with it, because of the annular member formed by the inside ring 25 of the ball bearing which constitutes it.

In a first stage (FIG. 3B), the fingers 35 of the central part 34 of the annular spring 32 are simply deflected, being in contact with the sleeve 12 of the maneuvering member 10.

They then extend axially forwards, in the direction opposite to that in which the drive member 11 is engaged on the maneuvering member 10.

As will be readily understood, the chamfer 21 on the sleeve 12 of the latter is adapted to facilitate the corresponding bending.

It will be understood that the relative dimensions of the annular spring 32 and the sleeve 12 are selected so that the circumferentially continuous part 33 of said annular spring 32 can actually engage over the latter.

As axial engagement of the drive member 11 over the maneuvering member 10 continues, the circumferentially continuous part 33 of the annular spring 32 comes into abutment relationship with the abutment shoulder 17 which projects radially for this purpose from the sleeve 12 of said maneuvering member 10, at its inside perimeter, in the vicinity of the bend 36 which it forms with the central part 34 divided into fingers 35.

Figure 3C:
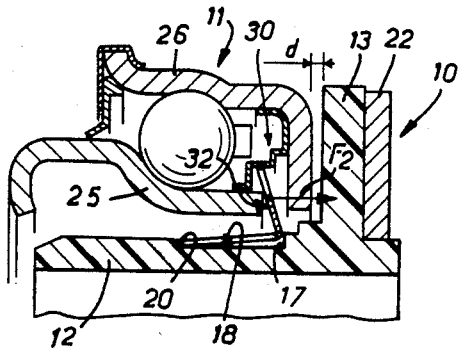

Conjointly, the relative dimensions of the fingers 35 of the annular spring 32 and the groove 18 in the sleeve 12 of the maneuvering member 10 being appropriately selected, said fingers 35 have their respective ends substantially in line with the flank 20 of the groove 18 farthest from the flange 13 and, by virtue of their inherent elasticity, they engage in this groove 18, as shown in FIG. 3C, until they bear elastically on the bottom of the latter.

At this stage, the radial rim 24 of the drive member 11 is still spaced from the flange 13 of the maneuvering member 10, being separated from the latter by a distance d, for example.

Thus if axial engagement of the drive member 11 on the maneuvering member 10 is continued, since the annular spring 32 is at this time butted up against the abutment shoulder 17 of the latter, through the inside ring 25 of the ball bearing which constitutes it, and more precisely through the edge of the outside perimeter of the corresponding edge surface of the latter, which has a diameter greater than that of the inside perimeter of its radial rim 24, the drive member 11 then exterts an axial thrust on said annular spring 32, in the direction of the arrow $F_2$ in FIG. 3C.

Figure 4:
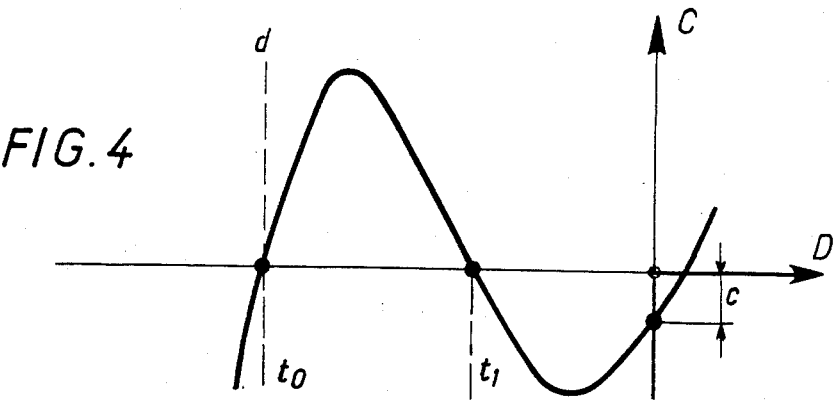
FIG. 4 is a graph showing the operation of the axially acting annular spring which this clutch release bearing comprises.

FIG. 4 is a graph on which the distance D between the radial rim 24 of the drive member 11 and the flange 13 of the maneuvering member 10 is plotted along the abscissae and the force developed by the annular spring 32 is plotted along the ordinates. This graph shows the familiar saddle-shaped curve characteristic of annular springs adapted to flex between two stable configurations.

At time $t_0$ at which, for the aforementioned distance d between the radial rim 24 of the drive member 11 and the flange 13 of the maneuvering member 10, said drive member 11 begins to exert an axial thrust on the annular spring 32 the value of this force is zero.

As axial engagement of the drive member 11 relative to the maneuvering member 10 continues, it initially increases and then decreases until, at time $t_1$, it again reaches the zero value and reverses in direction.

By turning inside out around a flexing line which, to a first approximation, is substantially coincident with its blend 36, the annular spring 32 then flexes of its own accord in the direction towards its second stable rest configuration in which, relative to the axial observation direction specified hereinabove and ignoring its central part 34 subdivided into fingers 35, also as mentioned hereinabove, it is generally convex.

Figure 3D:
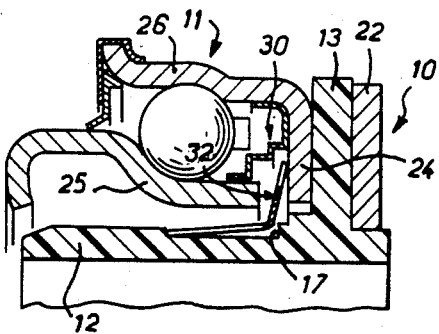

The tangs 37 forming its outside perimeter then bear on the radial rim 24 of the drive member 11 (FIG. 3D).

The dimensions adopted are such that, as required and as shown in FIGS. 1 and 3D, when the drive member 11 is in contact with the flange 13 of the maneuvering member 10 through its radial rim 24, a non-zero force is developed by the annular spring 32 and retains a value c which it sufficient to provide adequate transverse retention of said drive member 11 relative to said maneuvering member 10, this force naturally being selected so as to be compatible with correct self-centering in service.

As will have been understood, it is through the ends of the fingers 35 of its central part 34, which are inclined, that the annular spring 32 then bears on the maneuvering member 10 and, more specifically, on the flank 20 of the groove 18 in the sleeve 12 thereof, required to enable it to develop this force, although as a corrollary to this a clearance appears between it and the abutment shoulder 17 of the maneuvering member 10.

By virtue of the elastic clamping force exterted by its fingers 35 on the sleeve 12, it is conjointly immobilized on the latter, both transversely and circumferentially, so that, although it bears axially on the radial rim 24 of the drive member 11, it is not able to be entrained by the latter as it moves relative to the maneuvering member 10 for purposes of self-centering.

As will have been noted, in the configuration which it has at this time the annular spring 32 has moved away from the bearing surface 39 of the deflector 30 of the drive member 11 so that, as indicated hereinabove, it in no way interferes with the latter on possible transverse relative movement between the drive member 11 and the maneuvering member 10.

FIG. 1 shows in full line the configuration which the annular spring 32 occupies when assembly of the clutch release bearing which it equips according to the procedure described in detail hereinabove has been completed. It shows in dashed line its initial rest configuration before such assembly, that is to say that of its rest configurations which is not that which it tends to assume after such assembly.

As will be noted, it is through its axial end nearest the flange 13 of the maneuvering member 10 that the annular member constituted by the inside ring 25 of the ball bearing forming the drive member 11 interferes with the initial rest configuration of the annular spring 32, shown in dashed line, this inside ring 25 being sufficiently extended for this purpose, in order to be able to act on the annular spring 32 during assembly to change its configurations, as described in detail hereinabove.

As will also be noted, the assembly of the clutch release bearing in accordance with the invention requires intervention from one side only of the maneuvering member 10, such assembly being effected, as described, by simple axial engagement of the drive member 11 on the latter, from the front towards the rear, until the annular spring 32 turns inside out.

However, it goes without saying that this assembly could also be carried out by axial engagement of the maneuvering member 10 in the drive member 11, or by conjugate movement of the two members.

In all cases, the result is the same as if the drive member 11 where engaged on the maneuvering member 10.

Figure 5:
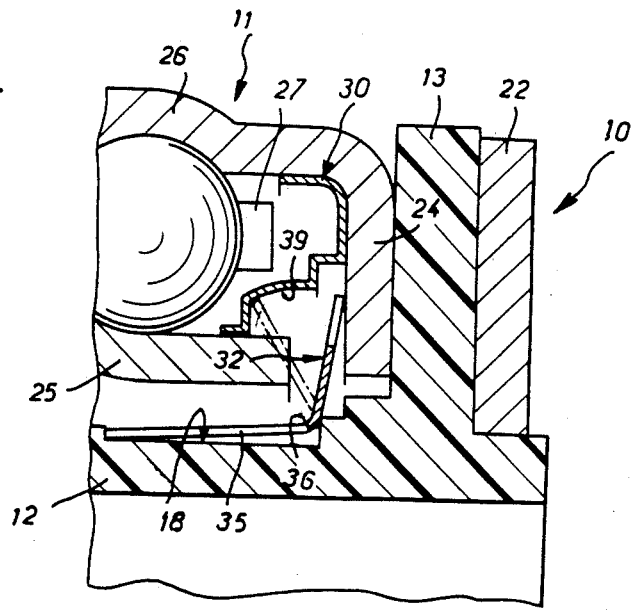
FIGS. 5 and 6 are partial views analogous to that of FIG. 1 and relating to respective alternative embodiments.

In the embodiment shown in FIG. 5, the bearing surface 39 of the deflector 30 provided for initially centering the annular spring 32 on the drive member 11 is generally part-spherical, being substantially centered on the line relative to which the circumferentially continuous part 33 of this annular spring 32 flexes.

However, as previously, this bearing surface 39 stops short at an axial distance from the radial rim 24 of the drive member 11.

Figure 6:
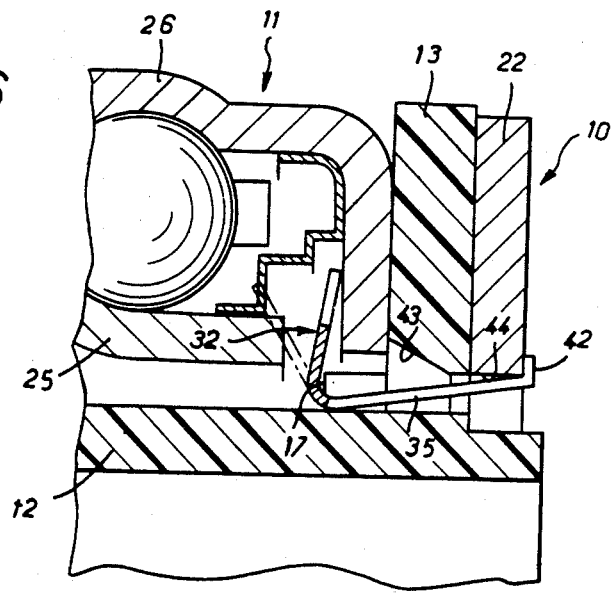

In the embodiment shown in FIG. 6, the annular spring 32 is one of which the fingers 35 are directed in rthe forward direction relative to the direction of engagement of the drive member 11 on the maneuvering member 10, having at their ends means adapted to hook on to said maneuvering member or a part rigidly attached to the latter in the axial direction.

In the embodiment shown, these means consist of a substantially right-angled lip 42 at the end of each of the fingers 35, directed away from the axis of the assembly.

After passing through an opening 43 provided for this purpose in the flange 13 of the maneuvering member 10, where the latter joins the sleeve 12 with which it is associated, and after passing through an opening 44, also provided for this purpose, in the bearing plate 22 and in corresponding relationship with the aforementioned opening, each finger 35 of this kind is hooked on to this bearing plate 22 by means of this lip 42, and it is thus through the intermediary of a bearing plate 22 of this kind that a finger 35 of this kind is hooked on to the maneuvering member 10 in this embodiment.

To facilitate the insertion of the fingers 35 of the annular spring 32, the openings 43 in the flange 13 of the maneuvering member 10 are preferably tapered, as shown.

It will be understood that in this embodiment the sleeve 12 of the maneuvering member 10 does not comprise any groove for the annular spring 32 to bear on, such bearing relationship being effected, as indicated hereinabove, through the lips 42 on its fingers 35.

However, as previously, a radial abutment shoulder 17 is provided on the sleeve 12 of the maneuvering member 10, for the annular spring 32 to butt up against during engagement of the drive member 11 on said maneuvering member 10.

In the foregoing, it has been assumed that the ring of the ball bearing constituting the drive member 11 through which the latter is adapted to act on the clutch release device of the clutch to be controlled is the inside ring 25 thereof.

Figure 7:
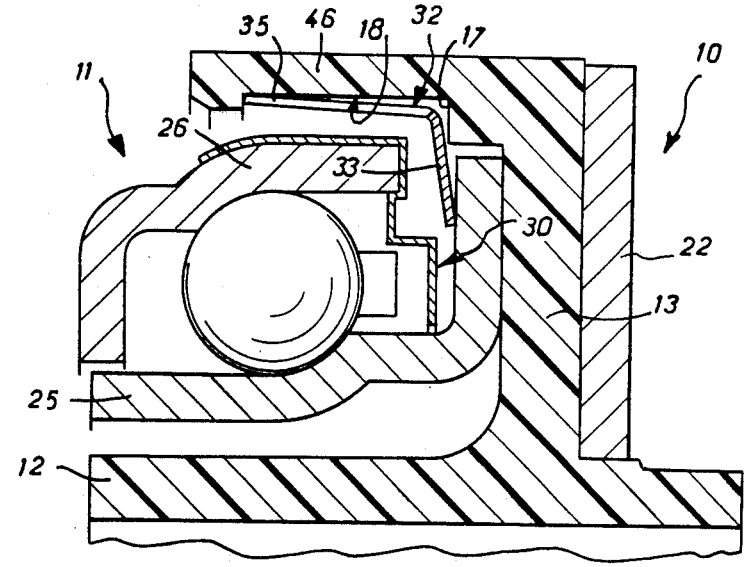
FIG. 7 is a view in axial cross-section analogous to that of FIG. 1 and concerning a further alternative embodiment.
Figure 8:
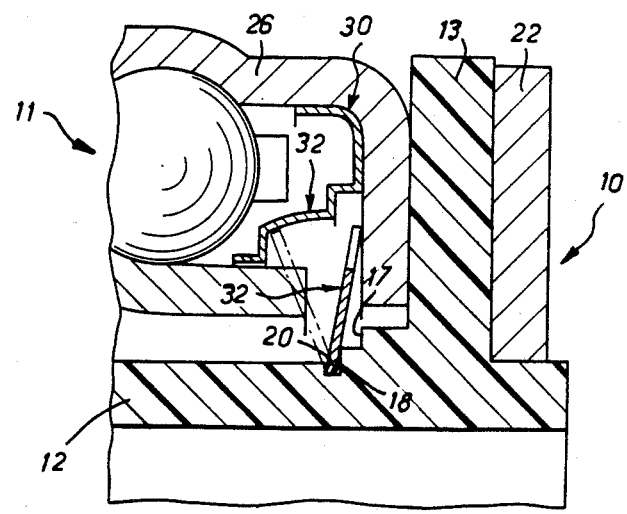
FIG. 8 is a view analogous to that of FIG. 5 and concerning a still further embodiment.

In an alternative arrangement (FIG. 7) this ring is the outside ring 26.

In this case the radial rim of the drive member 11 is part of its inside ring 25.

Also, to provide an axial support for the annular spring 32 the maneuvering member 10 comprises a second generally annular member 46 forming a rim at the perimeter of its flange 13, parallel to its sleeve 12.

The aforementioned groove 18 is thus formed in this rim, and it is also relative to this rim that the abutment shoulder 17 constituting one of the flanks of this groove 18 projects in the radial direction.

In the foregoing it has been assumed that the annular spring 32 has fingers 35 through which it bears axially on the maneuvering member 10.

As an alternative to this (FIG. 8) the annular spring 32 may be reduced to its circumferentially continuous part 33, bearing axially on the maneuvering member 10 merely through the inside perimeter of this part.

As previously, a groove 18 is provided for this purpose on the outside perimeter of the sleeve 12 of the maneuvering member 10.

Also as previously, the flank of this groove 18 which is nearest the flange 13 of the maneuvering member 10 in the axial direction is higher, so as to constitute an abutment shoulder 17 for the annular spring 32.

Conjointly, the flank 20 of the groove 18 which is farthest from flange 13 in the axial direction must be of sufficiently reduced height to permit the annular spring 32 to enter said groove 18 by simply slipping over the edge of this flank 20 on turning inside out.

In the limiting case the groove 18 may be dispensed with, the annular spring 32 bearing axially on the maneuvering member 10 by simply anchoring of its inside perimeter in the outside surface of the sleeve 12 of the latter.

Likewise, although mention is made hereinabove of the forming of tangs 37 on the outside perimeter of the annular spring 32, or more precisely of its circumferentially continuous part 33, so as to adapt the force exerted by it to the required value, this is not necessarily the case, and said outside perimeter may be circumferentially regular, without any undulation.

It will be understood that various changes in the details, materials and arrangements of parts, which have been herein described and illustrated in order to explain the nature of the invention, may be made by those skilled in the art within the principle and scope of the invention as expressed in the appended claims.

For example, instead of being integral with the sleeve 12, the flange 13 of the maneuvering member 10 could be attached to the latter, as by crimping, for example, especially if this sleeve 12 is of metal.

As mentioned hereinabove, this flange 13 may also be no more than a simple collar and in this case it may be through the intermediary of the bearing plate 22, which is then inserted between it and the radial rim 24 of the drive member 10, that said radial rim 24 bears on said flange 13; more generally, it is then through the intermediary, for example, of a bearing plate 22 of this kind that the radial rim 24 of the drive member 10 bears directly or indirectly on the flange 13 of the maneuvering member 10.

Moreover, although in the embodiment shown in FIG. 6 the fingers of the annular spring 32 employed can of themselves ensure axial retention of the bearing plate 22 in contact with the flange 13 of the maneuvering member 10, it goes without saying that in the other embodiments such axial retention may be brought about in any appropriate manner, by means of a snap-fastener action, for example and as known per se.

As the corresponding arrangements will be well known to those skilled in the art, they have not been described hereinabove.

Finally, as mentioned hereinabove, the deflector 30 of the ball bearing constituting the drive member 11 may be integral with the corresponding ball cage 27.

It is claimed:

1. Method of assembling a clutch release bearing which incorporates a maneuvering member comprising a transverse flange and an abutment shoulder spaced from the flange, and a drive member comprising at least one generally annular axial member, a transverse radial rim adapted to bear on the flange of the maneuvering member and between the radial rim and the annular member, an axially acting annular spring which is adapted to urge the radial rim of the drive member towards the flange of the maneuvering member, bearing to this end on the maneuvering member, and which has two stable configurations in one of which the annular spring is generally concave (relative to a given axial observation direction) and in the other of with the annular spring is generally convex (relative to the same axial observation direction), said method comprising the steps of inserting the drive member in the axial direction onto the maneuvering member, from the same side as the abutment shoulder and with the annular spring is a first of its configurations and, after the annular spring comes into abutting relationship with the abutment shoulder of the abutment shoulder of the maneuvering member continuing axial movement of the drive member until the annular member of the drive member causes the annular spring to flip over, changing from the first configuration to the second configuration.

2. Method according to claim 1, wherein the maneuvering member comprises at least one annular member formed with a groove on which the annular spring is adapted to bear, the groove having flanks of different heights, the higher flank being also nearer the transverse flange and of itself constituting the abutment shoulder which projects in the radial direction and against which the annular spring abuts on axial insertion of the drive member.

3. Method according to claim 1, wherein the annular spring has a central part divided into fingers which are adapted to bear on the maneuvering member, which are directed forwards (relative to the direction of insertion of the drive member on the maneuvering member), the ends of the fingers being hookable relative to the maneuvering member.

4. Method according to claim 1, wherein the drive member comprises a ball bearing having internally, between its races, a deflector for centering the annular spring on the drive member before it is inserted onto the maneuvering member.

* * * * *